Nov. 8, 1927.
J. ELDRIDGE ET AL
SLICING MACHINE
Filed April 6, 1925
1,648,583
3 Sheets-Sheet 2
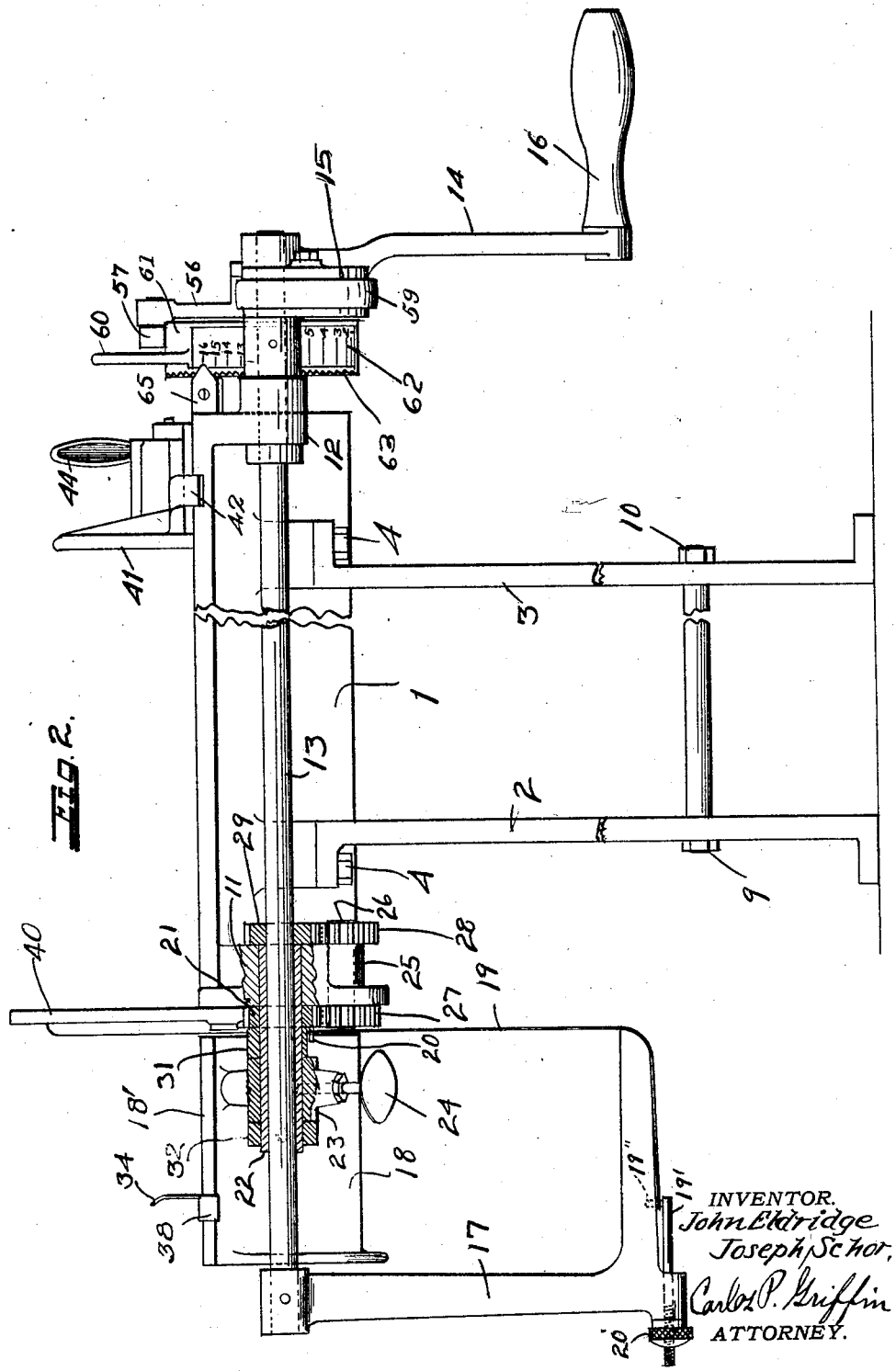
INVENTOR.
John Eldridge
Joseph Schor,
Carlos P. Griffin
ATTORNEY.

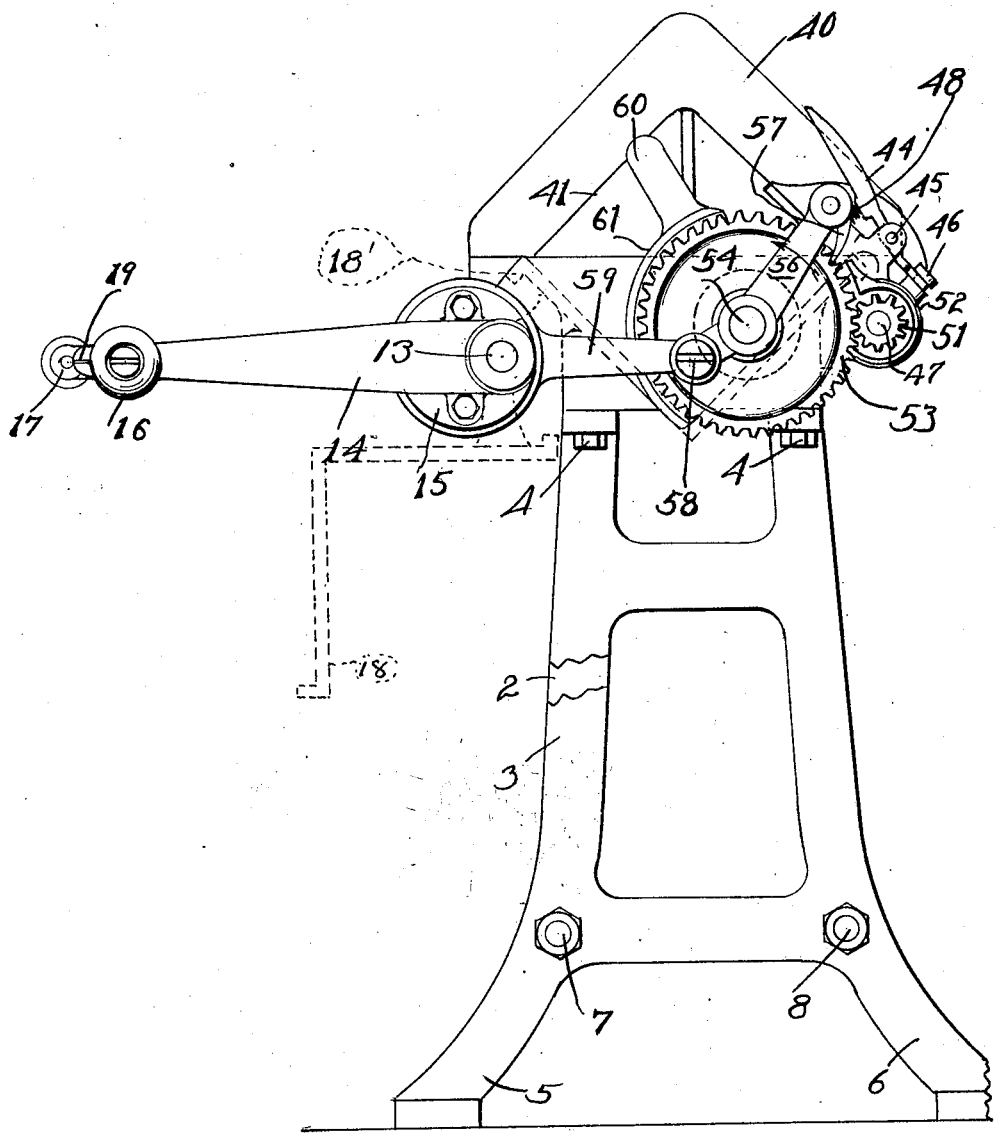

Nov. 8, 1927.
J. ELDRIDGE ET AL
1,648,583
SLICING MACHINE
Filed April 6, 1925  3 Sheets-Sheet 3
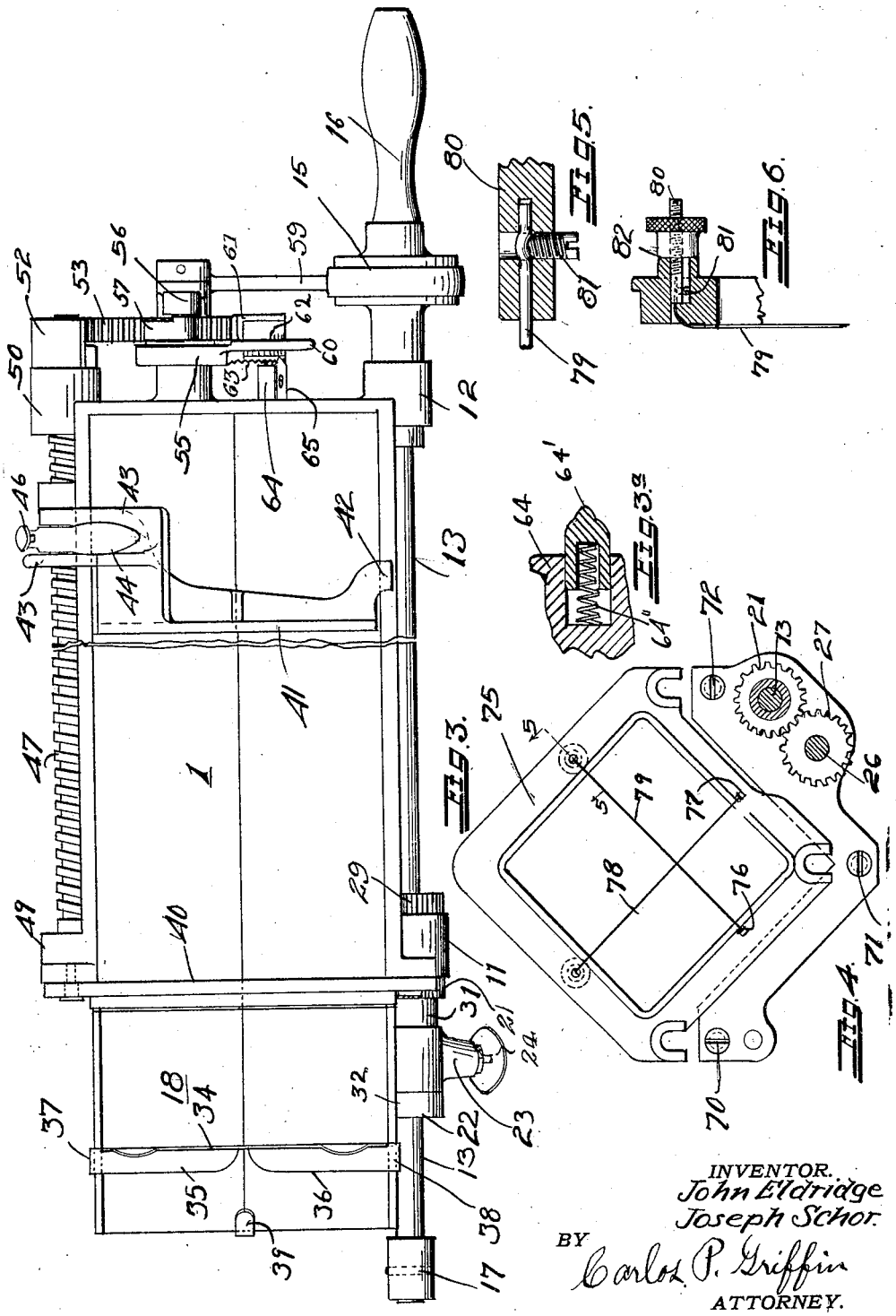
INVENTOR.
John Eldridge
Joseph Schor.
BY Carlos P. Griffin
ATTORNEY.

Patented Nov. 8, 1927.

1,648,583

UNITED STATES PATENT OFFICE.

JOHN ELDRIDGE, OF OAKLAND, AND JOSEPH SCHOR, OF SAN FRANCISCO, CALIFORNIA; IDA MADELINE ELDRIDGE ADMINISTRATRIX OF SAID JOHN ELDRIDGE, DECEASED.

SLICING MACHINE.

Application filed April 6, 1925. Serial No. 20,914.

This invention relates to a slicing machine used for the purpose of slicing cheese, butter, and other similar materials, and its object is to provide a machine which is capable of measuring the slices, and of increasing or diminishing the thickness of the slices whenever a change may be required.

Another object of the invention is to provide means whereby the slices will be very easily cut off, the slicing being effected with a steel wire in the place of a knife. It will be understood by those who have ever undertaken to cut loaf cheese, that it is a very difficult matter to cut slices of a given size with a knife, since the tendency of the cheese is to cling to the knife and pull the body of the material being cut out of shape, rather than to cut off a satisfactory slice. With the present invention the machine is arranged to produce slices from one-thirty-second of an inch in thickness up to one-half inch in thickness with regulated precision; larger cuts than that being made by a hand movement of the cheese loaf in the supporting trough.

Another object of the invention is to provide means whereby the die through which the cheese is cut may be removed and another die with wires thereon, placed in position for cutting butter into small sizes for restaurant use, may be inserted in the place of the cutting die for the cheese.

Another object of the invention is to provide means whereby the slices of cheese will be held in a neat pile where a considerable quantity of cheese is being cut, and whereby the slice holder may be turned out of the way when it is desired to cut butter; the butter slices ordinarily being allowed to drop into a pan of ice water.

Other objects of the invention will appear as the description proceeds.

An embodiment of the invention is shown in the accompanying drawings in which the same reference numeral is applied to the same portion throughout, but we are aware that there may be modifications thereof.

Fig. 1 is an end elevation of the machine looking from the right.

Fig. 2 is a side elevation of the machine, certain parts being shown in section, looking from the left, Fig. 1.

Fig. 3 is a plan view of the complete machine.

Fig. 4 is a front elevation of the cheese supporting trough, showing the butter die just ready to be placed in position thereon.

Fig. 5 is a sectional view on line 5—5 of Figure 4 of the means for holding one end of the cutting wire in the pin for tightening the wire on the butter die.

Fig. 6 is a view of the means for pulling the wire tight in the butter die when its other end has been secured thereto.

Fig. 3ª is a detail showing the spring stop for the guard for regulating the slice thickness.

The machine has a V-shaped trough 1, which is connected to the supporting frames 2 and 3, by means of four bolts, illustrated at 4. The lower ends of the frames are spread outwardly from each other, as indicated at 5, and 6, to provide an adequate support for the machine, and they are held a fixed distance apart by means of bolts 7 and 8, carrying the nuts 9 and 10 at their ends.

The V-shaped trough has a bearing 11 at one end, and another bearing 12 at the other end for the main shaft 13. This shaft is connected to the crank 14, which also carries an eccentric 15, and an operating handle 16. At its opposite end, the shaft is connected to an L-shaped arm 17, which arm passes across the slice supporting trough 18, and carries the cutting wire 19. The wire 19 is connected to a pin 19', having a hook 19" thereon, and the wire is tightened by means of the nurled nut 20', which is screwed on the end of the pin 19'. This wire is connected at the other end to a small pin 20 on a gear 21, which gear is loosely mounted on a tube 22, which extends into the bearing 11, and forms the support for the arm 23, carrying the slice supporting trough 18.

The arm 23 has a pin 24 extending thereinto, which can engage one of the two holes in the tube 22. One of these holes if engaged by the pin 24 will hold the trough in the position shown in Figs. 2 and 3. The other hole is so placed as to allow the trough to hang down out of the way when butter is being sliced. This position being indicated in the dotted lines in Fig. 1.

Just below the bearing 11, there is a bearing 25, for a short shaft 26, said shaft carrying two gears 27, 28. The latter is in mesh with a gear 29, on the shaft 13, and is driven thereby. The gear 27 is in mesh with the gear 21, and the result of the construction just outlined is that the gear 21, with its attached wire 19, will be rotated at precisely the same rate as the arm 17, thereby reducing the strain on the wire 19, and making it unnecessary for the wire to drag the gear 21 around.

The arm 23 is spaced away from the gear 21 by means of a collar 31, and it is prevented from moving off the end of the tube 22 by a collar 32.

The edges of the slice holder 18 are flanged on both sides, as indicated at 18', Fig. 1, and there is a plate 34 with flanges 35, 36, thereon which bear upon the bottom of the trough 18, and it has hooks 37, 38, which engage the flanges 18' to hold the plate upright, a spring 39 at the end of the slice supporting trough prevents it from being pushed off as the slices accumulate in the support.

When the operator starts to slice the cheese, he pushes the plate 34 up close against the cutting die. In order to push the mass of material through the cutting die 40, a movable plate 41 is used. This plate has an arm 42, which rests upon one edge of the trough 1, and at the other side of said plate there is an arm 43, which is provided with a spring pressed thumb lever 44, said lever being pivotally mounted on the arm 43 at 45, so that it can raise or lower the pin 46 to engage or disengage said pin from the screw threaded feed rod 47. A spring 48 holds the pin 46 normally engaged with the threads of the rod 47. The feed screw 47 is mounted in two bearings 49, 50, on the side of the trough opposite from the shaft 13, and it carries a small pinion 51 at one end thereof, said pinion being covered on all except one side by a guard 52.

The gear 51 is in mesh with a larger gear 53, which gear is revoluble on a stud 54. This stud also carries the gage plate 55, and the feed arm 56; said feed arm also carrying the pivoted feed pawl 57. The feed arm 56 is pivotally connected at 58 to the eccentric link 59, which link is reciprocated by the eccentric 15. The gage plate has a handle 60, and it has a guard 61. The guard carries a graduated plate 62, and it is notched at 63 so that it can be stopped in any desired position by bearing against a spring pressed plunger 64' supported in a lug 64 on the end of the trough 1. The spring is indicated at 64" (see Fig. 3ª). This lug 64 also carries a pointer 65 to determine the position to which the guard plate 61 is to be moved.

The cheese cutting die 40 is merely a rectangular die with open slots at its bottom to pass over screws 70, 71, 72 at the end of the trough 1, to bring the cutting face into alignment with the wire 19; but when it is desired to cut butter a cutting die such as 75 is used. This die is practically the same as the other, except that it is provided with two pins 76, 77, to which the cutting wires 79, 78, are secured at one end; at the other end, each wire (see Fig. 5 and Fig. 6) is inserted into a hole in the end of the rod 80, and secured therein by means of the set screw 81. This rod is threaded as shown in Fig. 6, and the thumb screw 82 serves to draw the wire as tight as may be desired. It will also be noticed that set screw 81 serves not only to secure the wire 79 to the screw 80, but also prevents the screw 80 from rotating as the nurled nut 82 is turned to tighten the wire.

It will be seen that the die for cutting butter may also be used for cutting cheese into small squares, or into long strips, if desired, in which latter event the wire 19 is temporarily removed.

In operation of the slicing machine a square of cheese or butter is placed in the trough 1, the operator then pushes the plate 34 up close to the cutting die 40. The handle 16 being in the position shown in Figure 1 is now turned clockwise which turns the shaft 13 and with it the arm 17 and the cutting wire 19, the end of the cutting wire 19 being attached to pin 20 on pinion 21 which is rotatable on the tube 22, the pinion 21 being in mesh with pinion 27 is then turned at the speed of the shaft 13 by means of the short shaft 26, the pinion 28 and the pinion 29 fixed on the shaft, the tube 22 being fixed in the bearing 11 forms an extended bearing for the slice holding trough 18. By pulling out the pin 24 the trough 18 will swing down as shown in dotted lines in Figure 1.

While the wire is cutting through the cheese the arm 56 is moving back in the direction of the arrow in Figure 1 and the pawl 57 idles over the teeth of the gear 53 and rides on the guard plate 61 for a short distance depending how the gage plate 55 is set. During the travel of the cutting wire after the slice is cut the arm moves in reverse direction of the arrow and the pawl will slide off the plate 61 and engage the teeth of the gear 53 and move it to the end of the stroke of the arm. It will be seen that by moving the plate 61 to different positions the movement of the gear 53 is lengthened or shortened and thus the movable plate 41 feeds the cheese forward to make different thicknesses of slices by means of the screw 47 and the pinion 51. By pressing on the thumb lever 44, the plate 41 can be swung up out of the trough.

To change dies the screws 70—71 and 72 are loosened and the die lifted out and another slipped in.

What we claim is as follows, but various modifications may be made in the construction shown in the drawings and above partic- ularly described form, within the purview of our invention:

1. A slicing machine comprising a supporting trough, a follower therein, a drive shaft on one side of the trough and a feed screw on the other, means to operate the drive shaft, an arm carried thereby, a slice support, means to hold said slice support a short distance from the trough, a wire carried by the arm, a small gear to which said wire is connected at one end, and means to drive said gear from the drive shaft, whereby material will be sliced and the gear operated at the same rate of speed as the arm to reduce the tension necessary for the wire.

2. A slicing machine comprising a supporting trough, a drive shaft on one side of said trough, a feed screw upon the other side, a follower in the trough driven by said feed screw, means to intermittently operate the feed screw and follower, a slice support, a tubular member surrounding the drive shaft to hold the slice support in a given position, an arm carried by the drive shaft adapted to rotate around the slice support, a cutting wire connected to said arm, a pinion on the supporting tube, said pinion being adapted to hold the other end of said cutting wire, means to drive said pinion at the same rate of speed as the wire supporting arm, and means to vary the thickness of the slices cut.

3. A slicing machine, comprising a support for the material to be sliced, a feed screw on one side of said support, a drive shaft on the other side of said support, a crank on said drive shaft, an eccentric on said shaft adapted to swing an arm carrying a pawl, a gear driven in one direction by said pawl, a pinion in mesh with said gear, a screw shaft driven by said pinion, a feed plate with a threaded portion engaged by said screw shaft, an adjustable guard plate adapted to carry said pawl out of engagement with the teeth of said gear for a portion of the travel of said pawl to control the movement of said gear.

4. In a slicing machine, a supporting trough, a drive shaft on one side of said trough, a feed screw on the opposite side of said trough, a follower operated by said feed screw, a slicing arm carried by the drive shaft, a gearing for operating the feed screw from the drive shaft, including a pawl and an adjustable guard varying the distance of contact of said pawl with said gearing to vary the thickness of the slices cut.

5. A slicing machine comprising a support for the material to be sliced, a bracket extending from the support, a drive shaft journaled in the bracket, means for turning the shaft, a ring journaled on the bracket, a slice holder mounted on the bracket, an arm fixed on said shaft, a cutting element carried by the ring and arm and arranged to move between the support and the slice holder, and means for rotating said ring equally with the drive shaft.

6. A slicing machine comprising a support for the material to be sliced, a bracket extending from the support, a drive shaft journaled in the bracket, means for turning the shaft, a ring journaled on the bracket, a slice holder mounted on the bracket, an arm fixed on said shaft, a cutting element carried by the ring and arm and arranged to move between the support and the slice holder, and a jack shaft connected for rotation with both the ring and the drive shaft.

7. A slicing machine comprising a support for the material to be sliced, a bracket extending from the support, a drive shaft journaled in the bracket, means for turning the shaft, a ring journalled on the bracket, a slice holder mounted on the bracket, an arm fixed on said shaft, a cutting element carried by the ring and arm and arranged to move between the support and the slice holder, means for rotating said ring equally with the drive shaft, and means operatively connected to said drive shaft for feeding material on said support to the cutting element.

8. A slicing machine comprising a support for the material to be sliced, a bracket extending from the support, a drive shaft journaled in the bracket, means for turning the shaft, a ring journaled on the bracket, a slice holder mounted on the bracket and extending closely adjacent the end of the support, an angular arm fixed on the shaft and adapted to rotate bodily about the slice holder when the shaft is turned, a wire held at its inner end of said ring and at its outer end on said arm and arranged to move between the support and the slice holder, and means operated by said drive shaft for rotating said ring at the same number of turns per minute as said arm.

In testimony whereof we have hereunto set our hands March, A. D. 1925.

JOHN ELDRIDGE.
JOSEPH SCHOR.